US010492234B2

(12) United States Patent
Camacho et al.

(10) Patent No.: US 10,492,234 B2
(45) Date of Patent: Nov. 26, 2019

(54) DETERMINING AVAILABILITY OF A CELLULAR CONNECTION BETWEEN A VEHICLE AND A VEHICLE BACKEND SYSTEM

(71) Applicant: GENERAL MOTORS LLC, Detroit, MI (US)

(72) Inventors: Esteban Camacho, Belleville, MI (US); Alexander X. Cermak, Grosse Pointe Woods, MI (US); Matthew R. Waldner, Grosse Pointe Woods, MI (US); Ryan Olejniczak, Clinton Township, MI (US)

(73) Assignee: General Motors LLC, Detroit, MI (US)

( * ) Notice: Subject to any disclaimer, the term of this patent is extended or adjusted under 35 U.S.C. 154(b) by 388 days.

(21) Appl. No.: 15/332,837

(22) Filed: Oct. 24, 2016

(65) Prior Publication Data

US 2018/0116002 A1 Apr. 26, 2018

(51) Int. Cl.
*H04W 4/00* (2018.01)
*H04W 76/10* (2018.01)
*H04W 8/02* (2009.01)
*H04W 8/26* (2009.01)
*H04W 76/18* (2018.01)

(52) U.S. Cl.
CPC ............. *H04W 76/10* (2018.02); *H04W 8/02* (2013.01); *H04W 8/26* (2013.01); *H04W 76/18* (2018.02)

(58) Field of Classification Search
CPC ......... H04W 76/10; H04W 8/26; H04W 8/02; H04W 76/02
See application file for complete search history.

(56) References Cited

U.S. PATENT DOCUMENTS

| | | | | |
|---|---|---|---|---|
| 2008/0153523 | A1* | 6/2008 | Febonio | H04W 4/14 455/466 |
| 2009/0276507 | A1* | 11/2009 | Ahn | H04L 67/104 709/220 |
| 2013/0169733 | A1* | 7/2013 | Jang | H04N 7/15 348/14.01 |
| 2013/0301522 | A1* | 11/2013 | Krishna | H04L 61/2528 370/328 |
| 2014/0324972 | A1* | 10/2014 | Zhang | H04L 67/26 709/204 |

* cited by examiner

*Primary Examiner* — Abdelillah Elmejjarmi
(74) *Attorney, Agent, or Firm* — Reising Ethington P.C.; David Willoughby

(57) ABSTRACT

A vehicle backend system and a method of using the backend system to determine availability of a cellular connection between the backend system and a vehicle prior to the backend system attempting to establish the cellular connection. The method includes: determining at the backend system that a vehicle service is to be provided to the vehicle; based on the determination, transmitting from the backend system to a wireless service provider (WSP) or a WSP server a query associated with the connection status of the vehicle; in response to transmitting the query, receiving at the backend system a response to the query, wherein the response indicates that the vehicle is either in a connected state or an un-connected state; and when the vehicle is in the connected state: attempting to establish the cellular connection between the backend system and the vehicle; and when the cellular connection is established, providing the vehicle service.

17 Claims, 2 Drawing Sheets

DETERMINING AVAILABILITY OF A CELLULAR CONNECTION BETWEEN A VEHICLE AND A VEHICLE BACKEND SYSTEM

TECHNICAL FIELD

The present invention relates to determining whether to place a cellular call to a vehicle from a vehicle backend system, and more particularly to determining whether the vehicle is connected to a wireless carrier system prior to placing the cellular call.

BACKGROUND

Backend entities or back offices exist to provide vehicles with various services such as turn-by-turn directions, road service, etc. In some instances, the back office attempts to contact a vehicle and is unsuccessful. In some circumstances, this is due to the vehicle simply not being connected to a home or visiting cellular network. For example, the vehicle is out-of-range due to its location or the like. The back office often may make repeated unsuccessful attempts to contact the vehicle, and such repeated and unsuccessful attempts may be a waste of computing resources. In addition, such repeated attempts add network traffic and promote cellular network congestion.

The problem described above is compounded because the back office is not created to service a single vehicle, but instead countless numbers of vehicles. And at any given time, many of those vehicles may not be connected to a cellular network when the back office attempts to call. Thus, there is a need to improve the computing efficiency at the back office by minimizing unsuccessful call attempts.

SUMMARY

According to an embodiment of the invention, there is provided a method of determining availability of a cellular connection between a vehicle backend system and a vehicle prior to the backend system attempting to establish the cellular connection. The method includes the steps of: determining at the backend system that a vehicle service is to be provided to the vehicle; based on the determination, transmitting from the backend system to a wireless service provider (WSP) or a WSP server a query associated with the connection status of the vehicle to a wireless carrier system (WCS) used by the WSP; in response to transmitting the query, receiving at the backend system a response to the query, wherein the response indicates, with respect to the WCS, that the vehicle is either in a connected state or an un-connected state; and when the vehicle is in the connected state: attempting to establish the cellular connection between the backend system and the vehicle by placing a cellular call between the backend system and the vehicle; and when the cellular connection is established, providing the vehicle service via the cellular call in response to the established cellular connection.

According to another embodiment of the invention, there is provided a vehicle backend system that is configured to determine availability of a cellular connection between the backend system and a vehicle prior to the backend system attempting to establish the cellular connection. The system includes at least one processor and at least one memory device, wherein the at least one memory device stores computer program instructions executable by the at least one processor. The computer program instructions include: instructions to place an application programming interface (API) call to one of a wireless service provider (WSP), a Home Location Register (HLR) associated with the WSP, or a Home Subscriber Server (HSS) associated with the WSP, wherein the API call includes a query associated with a connection status of the vehicle to a wireless carrier system (WCS) used by the WSP; instructions to receive a response to the query in response to placing the API call, wherein the response to the query indicates, with respect to the WCS, that the vehicle connection status is one of a connected state or an un-connected state; instructions to attempt to establish the cellular connection between the backend system and the vehicle when the vehicle connection status is the connected state; and instructions to delay an attempt to establish the cellular connection between the backend system and the vehicle for a predetermined period of time when the vehicle connection status is the un-connected state, and following the predetermined period of time, instructions to place another API call, and instructions to repeat the instructions associated with receiving the response to the query, in response to placing the another API call.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

Described below is a vehicle backend system that is configured to determine availability of a cellular connection between it and a vehicle. For example, the backend system can be configured to determine whether a particular vehicle is connected to a wireless carrier system prior to the backend system attempting to establish a cellular connection. More particularly, the backend system may determine availability by communicating with a wireless service provider (WSP) or a clearinghouse server associated with the WSP, such as a home location register (HLR) or a home subscriber server (HSS). For example, as described more below, when queried, the WSP, the HLR, or the HSS may provide information associated with the connection status of the particular vehicle. Based on that information, the backend system may determine whether to place a cellular call to the particular vehicle at that time—or whether to place that cellular call at a later time. In this manner, the backend system may pre-qualify the establishment of a cellular connection between it and the particular vehicle—thus, placing fewer unsuccessful cellular calls.

Further, the methods described herein may be implemented for any number of vehicles which are serviced by the backend system—thereby improving computer processing efficiency of the backend system. The system, as well as its implementation, will be discussed in greater detail below.

Communications System—

Figure 1:
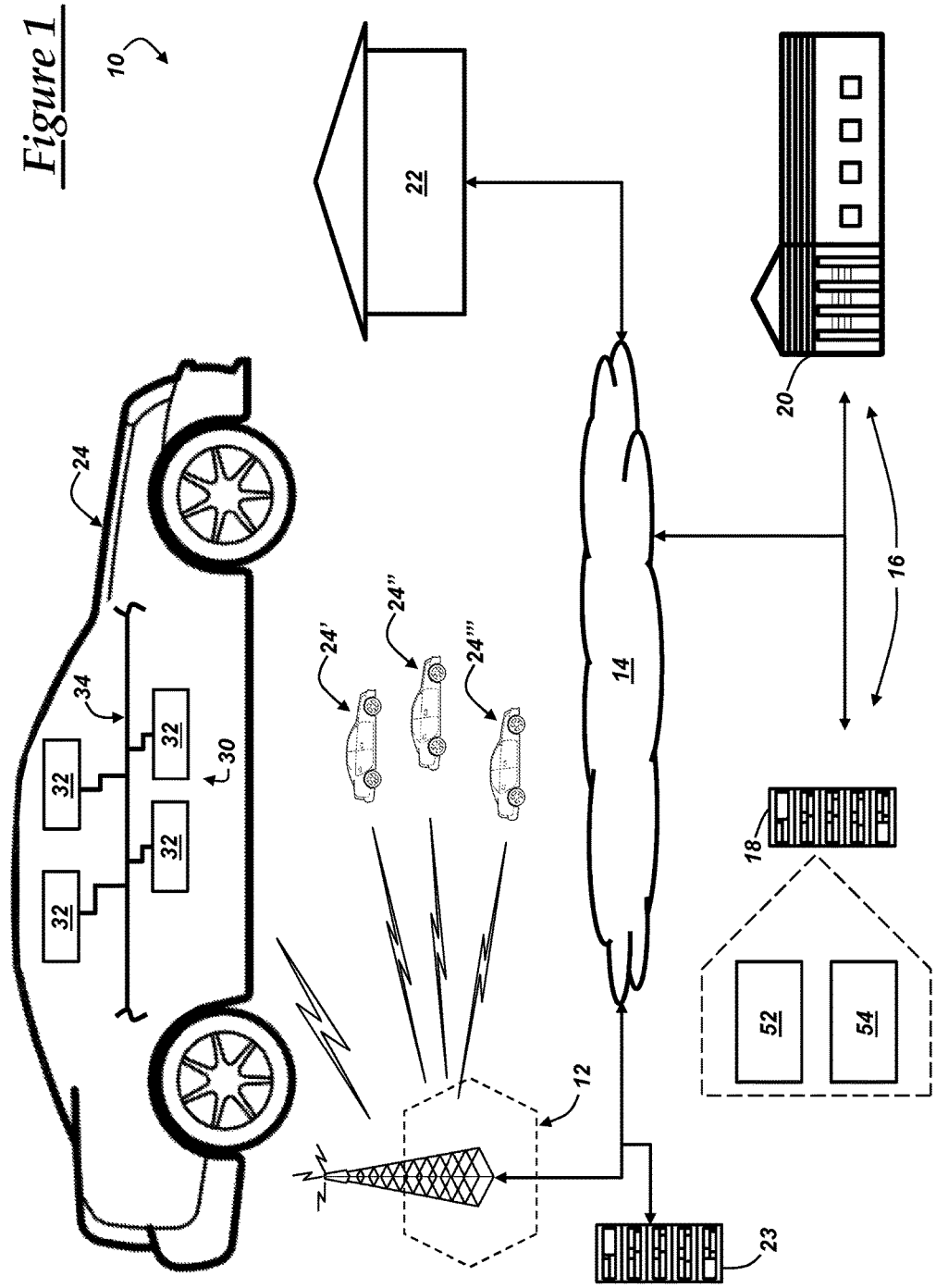
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes: one or more wireless carrier systems 12; a land communications network 14; a vehicle backend system 16 that may include at least one of a remote server 18, a data service center 20, or both; a wireless service provider (WSP) 22; a clearinghouse or WSP server 23 embodied as a home location register (HLR) or a home subscriber server (HSS); and one or more vehicles 24, 24', 24", 24'". It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Wireless carrier system 12 may be any suitable cellular telephone system that includes one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 12 with the land network 14 or to connect the wireless carrier system with user equipment (UEs, e.g., which include vehicles 24, 24', 24", 24'"). Cellular system 12 can implement any suitable communications technology, including for example, analog technologies such as AMPS, or the newer digital technologies such as LTE, CDMA (e.g., CDMA2000), or GSM/GPRS. In general, wireless carrier systems 12, their components, the arrangement of their components, the interaction between the components, etc. is generally known in the art.

Land network 14 may be a conventional land-based telecommunications network that is connected to one or more landline telephones and connects the wireless carrier system 12 to backend system 16 and further connects the carrier system 12 to the WSP 22 and WSP server 23. For example, land network 14 may include a public switched telephone network (PSTN) such as that used to provide hardwired telephony, packet-switched data communications, and the Internet infrastructure. One or more segments of land network 14 could be implemented through the use of a standard wired network, a fiber or other optical network, a cable network, power lines, other wireless networks such as wireless local area networks (WLANs), or networks providing broadband wireless access (BWA), or any combination thereof. Furthermore, data service center 20, WSP 22, or WSP server 23 need not be connected via land network 14, but could include wireless telephony equipment so that it can communicate directly with a wireless network, such as wireless carrier system 12.

According to one embodiment, the vehicle backend system 16 includes both the data service center 20 and a plurality of remote servers 18—in some implementations, the service center 20 may maintain one or more private connections between it and remotely-located servers 18. As described below, the service center 20 and the servers 18 may be arranged to provide a number of vehicle services to vehicles 24, 24', 24", 24'". For example, in accordance with a subscriber relationship between users of the vehicles and the backend system 16, the backend system may provide navigation services, emergency vehicle services, vehicle software update services, various notification services, etc., as will be explained more below.

In some implementations, remote server 18 can be one of a number of computers accessible via a private or public network such as the Internet. Each such server 18 can be used for one or more purposes, such as a web server accessible via land network 14 and/or wireless carrier 12. Other such accessible servers 18 can be, for example: a service center computer where diagnostic information and other vehicle data can be uploaded from vehicles 24, 24', 24", 24'"; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicles 24, 24', 24", 24'" or data service center 20, or both. Remote server 18 can also be used for providing Internet connectivity such as DNS services or as a network address server that uses DHCP or other suitable protocol to assign an IP address to the vehicles 24, 24', 24", 24'".

In at least one embodiment, each server 18 includes one or more processors 52 coupled to memory (or one or more memory devices) 54. Processor(s) 52 can be any type of device capable of processing and/or executing instructions, including microprocessors, microcontrollers, host processors, controllers, server-to-server communication processors, and application specific integrated circuits (ASICs). Processor(s) 52 may be dedicated to a particular backend system function, or some processor(s) may be shared with other backend system or other remote server computers.

In at least one embodiment, the processor 52 may perform or execute a number of instructions stored on memory 54 to pre-qualify the connectivity of a vehicle to the wireless carrier system 12, including one or more of the following: (1) identifying a list or listing of vehicles (e.g., vehicle 24, 24', 24", 24'", etc.) having subscriber relationships with the backend system 16; (2) acquiring or looking up in database or memory 54 a unique identifier for each of the vehicles 24, 24', 24", 24'", etc. on the list; (3) placing an application programming interface (API) call to the WSP 22 or WSP server 23, wherein the call includes a query pertaining to whether each of the list of vehicles 24, 24', 24", 24'", etc. is currently connected to the wireless carrier system 12; (4) receiving a response to the query indicating whether each of the vehicles 24, 24', 24", 24'", etc. presently are registered with or attached to the cellular network; (5) for each vehicle 24, 24', 24", 24'", etc. registered with or attached to the cellular network, attempting a cellular call via the WCS 12 to the respective vehicles; and (6) for each vehicle 24, 24', 24", 24'", etc. not registered with or not attached to the cellular network, re-querying the WSP 22 or WSP server 23 at a later time in an attempt to pre-qualify placing a cellular call thereto. The instructions can include pausing, waiting, or adding a delay having a predetermined duration of time before the respective re-queries.

As used herein, pre-qualifying a connection means determining the availability of a wireless communication connection between a wireless carrier system and a vehicle prior to attempting to establish a connection with the vehicle from a backend system via the wireless carrier system. For example, pre-qualifying an establishing of a cellular connection between the vehicle backend system 16 (e.g., the server 18 and/or the service center 20) and one of vehicles 24, 24', 24", 24'" includes making one or more preliminary assessments beforehand or in advance of actually placing cellular calls to each of the one of vehicles 24, 24', 24", 24'".

Of course, the processor(s) 52 may carry out other instructions stored on memory 54 as well. Thus, it should be appreciated that processor 52 may carry out at least a portion of the method described herein, as will be discussed in greater detail below.

Memory 54 of server 18 may be used to store any suitable vehicle backend data, such as vehicle data records, as well as the exemplary method instructions discussed above. Memory 54 includes any non-transitory computer usable or readable medium, which includes one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), and magnetic or optical disks or tapes. In at least one implementation, the memory 54 includes non-volatile memory (e.g., ROM, EPROM, EEPROM, etc.). These of course are merely examples; other implementations are contemplated herein.

Data service center 20 is designed to provide the vehicle 24 with a number of different system back-end functions and generally includes one or more switches, servers, databases, live advisors, as well as an automated voice response system (VRS. These various data service center components are preferably coupled to one another via a wired or wireless local area network. Switch, which can be a private branch exchange (PBX) switch, routes incoming signals so that voice transmissions are usually sent to either the live adviser by regular phone or to the automated voice response system using VoIP. The live advisor phone can also use VoIP; VoIP and other data communication through the switch may be implemented via a modem connected between the switch and network. Data transmissions are passed via the modem to server and/or database. Database can store account information such as subscriber authentication information, vehicle identifiers, profile records, behavioral patterns, and other pertinent subscriber information. Data transmissions may also be conducted by wireless systems, such as 802.11x, GPRS, and the like. Although one embodiment has been described as it would be used in conjunction with a manned data service center 20 using a live advisor, it will be appreciated that the data service center can instead utilize VRS as an automated advisor or, a combination of VRS and a live advisor can be used. Further, a number of automated vehicle services may be provided by the data service center 20, e.g., wherein the data service center 20 communicates with the vehicles 24, 24', 24", 24'", etc. without interaction by drivers or users of the respective vehicles.

The wireless service provider (WSP) 22 (a.k.a., wireless communications service provider or mobile network operator (MNO)) includes any entity which utilizes the wireless carrier system (WCS) 12 to provide cellular services to cellular devices, including providing cellular services to mobile devices and onboard telematics equipment within vehicles 24, 24', 24", 24'". Thus, WSPs22 may comprise one or more networked computers and may be connected to the land network 14 via any suitable connection; further, they typically control various wireless hardware and software systems to sell and/or deliver cellular services to end users, such as vehicles 24, 24', 24", 24'", as will be appreciated in the art. In at least one embodiment, the backend system 16 may have a relationship with at least one WSP—e.g., such that vehicles 24, 24', 24", 24'" which have a subscriber services relationship with the backend system 16 consequently have a subscriber services relationship with a particular WSP 22.

WSPs 22 typically maintain or support WSP servers 23 which are connected to the core network of the wireless carrier system 12—e.g., to a mobile switching center (MSC), to a mobility management entity (MME), or the like. As discussed above, non-limiting examples of the WSP 23 include a Home Location Register (HLR) associated with the WSP 22 or a Home Subscriber Server (HSS) associated with the WSP 22. The HLR/HSS may store information pertaining to whether user equipment (UE) has registered with or attached to the carrier system 12 (or more especially registered with or attached to a particular cell within the system 12). HLRs and HSSs and their functions are generally known and will not be discussed further here.

FIG. 1 illustrates multiple vehicles 24, 24', 24", 24'", and each vehicle may have a subscriber relationship with the backend system 16. Vehicles 24, 24', 24", 24'" may be the same or similar; therefore, only one vehicle (24) will be described herein. Vehicle 24 is depicted as a passenger car, but it should be appreciated that any other vehicle including motorcycles, trucks, sports utility vehicles (SUVs), recreational vehicles (RVs), marine vessels, aircraft, etc., can also be used. Vehicle 24 may include a vehicle communication system 30 that includes, among other things, one or more vehicle system modules (VSMs) 32 and one or more network connections 34.

Vehicle system modules (VSM) 32 may be embodied as electronic hardware components or modules located throughout the vehicle 24 and typically receive input from one or more sensors and use the sensed input to perform diagnostic, monitoring, control, reporting and/or other functions. Non-limiting examples of VSMs 32 include a body control module (BCM) for controlling power locks, headlights, etc., an engine control module (ECM) for controlling fuel ignition, ignition timing, etc., an onboard diagnostics module (OBDM) for reporting diagnostic trouble codes and the like. As will be appreciated by those skilled in the art, the above-mentioned VSMs are only examples of some of the modules that may be used in vehicle 24, and numerous other examples are also possible.

At least one VSM 32 may be a gateway module such as a vehicle telematics unit adapted for short range wireless communication and/or cellular communication. For example, a telematics unit may be an OEM-installed (embedded) or aftermarket device that is installed in the vehicle 24 and that enables wireless voice and/or data communication over wireless carrier system 12 and via wireless networking. This enables the vehicle to communicate with backend system 16, other telematics-enabled vehicles, or some other entity or device (e.g., via cellular communication according to an LTE, GSM, CDMA, or other suitable telecommunication standard). The telematics unit preferably uses radio transmissions to establish a communications channel (a voice channel and/or a data channel) with wireless carrier system 12 so that voice and/or data transmissions can be sent and received over the channel. By providing both voice and data communication, the telematics unit enables the vehicle 24 to offer a number of different services including those related to navigation, telephony, emergency assistance, diagnostics, infotainment, user notification services, etc. Data can be sent either via a data connection, such as via packet data transmission over a data channel, or via a voice channel using techniques known in the art. For combined services that involve both voice communication (e.g., with a live advisor or voice response unit at the data services center 20) and data communication (e.g., to provide GPS location data or vehicle diagnostic data to the data services center), the system can utilize a single call over a voice channel and switch as needed between voice and data transmission over the voice channel, and this can be done using techniques known to those skilled in the art.

As will be explained in greater detail below, the telematics unit may be adapted receive data associated with configuration changes of communication system 30, as well as vehicle system updates (e.g., software or instructional updates) associated one or more vehicle system modules 32. For example, the telematics unit may receive the updates and/or configuration changes from the backend system 16 via a so-called OTA or 'over-the-air' cellular communication. Receipt of OTA data or messages—and even installation of the vehicle system updates and configuration changes—may occur, in some instances, automatically and without user interaction.

Network connection(s) 34 include any wired or wireless intra-vehicle communications system for interconnecting or coupling the VSMs 32—as well as other vehicle electronic devices, sensors, etc.—to one another. For example, network connection 34 may be a data bus (e.g., a communication bus, entertainment bus, etc.). Non-limiting examples of suitable network connections 34 include a controller area network (CAN), a media oriented system transfer (MOST), a local interconnection network (LIN), a local area network (LAN), and other appropriate connections such as Ethernet, Audio-Visual Bridging (AVB), or others that conform with known ISO, SAE and IEEE standards and specifications, to name but a few.

Below, one or more methods of using the communications system 10 will be described. More particularly, at least one embodiment of a method will be described of pre-qualifying an establishing of a cellular connection between the vehicle backend system 16 and the vehicle 24 prior to the backend system attempting to establish (or actually establishing) such a cellular connection. The method(s) described below may be applied to a number of vehicles 24, 24', 24", 24''', etc. individually or at least partially concurrently, as will become more apparent from the description below.

Method—

Figure 2:
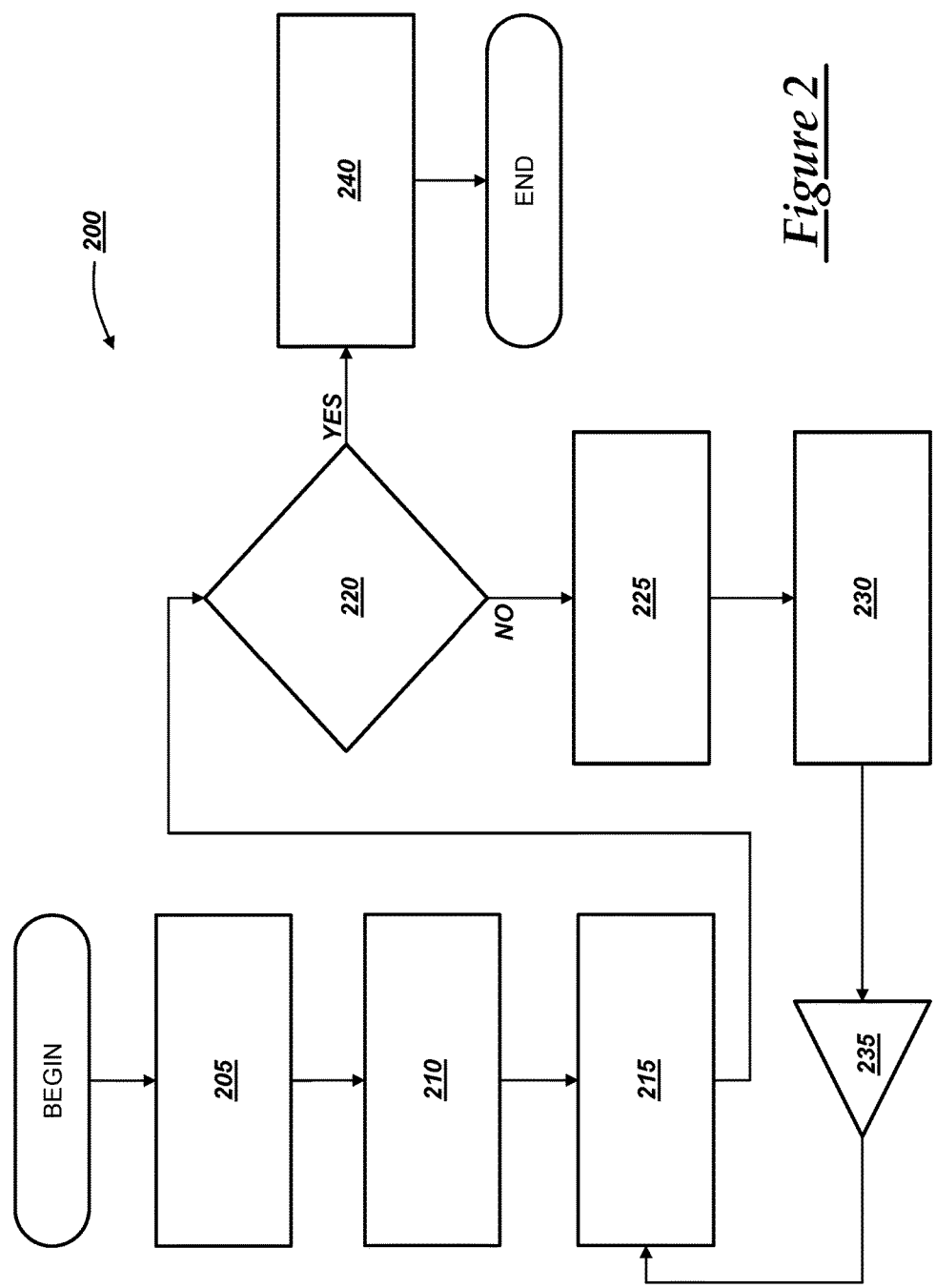
FIG. 2 is a flow diagram of a method of pre-qualifying an establishing of a cellular connection between a vehicle backend system and a vehicle prior to the backend system attempting to establish the cellular connection.

As shown in the flow diagram of FIG. 2, such a method 200 is illustrated that pertains to determining availability of a cellular connection between a vehicle backend system and a vehicle prior to the backend system attempting to establish the cellular connection. More particularly, the method is described with respect to a single vehicle 24 that has a subscriber relationship with the backend system 16; however, as described below, it is contemplated that the method may be performed using a so-called 'batch job,' wherein the backend system 16 pre-qualifies a number of vehicles 24, 24', 24", 24''' at least partially concurrently.

The method may begin with step 205 wherein the backend system 16 identifies or determines that a vehicle service is to be provided by way of a cellular connection with vehicle 24. According to one implementation, using a vehicle data record stored in server 18, the backend system 16 may determine automatically that vehicle 24 should receive a particular vehicle system update. (In general, the pre-qualification steps of method 200 are described herein in the context of providing a vehicle system update; however, it should be appreciated that the backend system 16 may desire to communicate other data to the vehicle 24—e.g., instead of the update).

In step 210, the backend system (e.g., server 18) may determine or otherwise acquire a unique identifier associated with vehicle 24; this identifier also may be stored in server 18—e.g., in the vehicle data record Non-limiting examples of the identifier include: a mobile directory number (MDN), an international mobile subscriber identity (IMSI), and a device ID that includes one of a mobile equipment identifier (MEID), an international mobile station equipment identity (IMEI), or an electronic serial number (ESN), just to cite a few examples. Other identifiers are also possible. In at least one embodiment, the backend server 18 determines an MDN—e.g., a so-called 'telephone number.' Steps 205 and 210 may occur in any suitable order, or concurrently.

In step 215 which follows, the backend system 16 may send a query to at least one of the WSP 22 or the WSP server 23. The query may include the vehicle identifier—e.g., in the present embodiment, a phone number associated with a telematics unit of the vehicle 24—and may request data associated with a connection status of the vehicle 24. As used herein, the connection status for any vehicle may be one of a connected state or an unconnected state, wherein the connected state indicates that the vehicle 24 is registered with or attached to a cell in the wireless carrier system (WCS) 12, wherein the un-connected state indicates that the vehicle 24 is presently unregistered with or presently unattached to a cell in the WCS 12.

In at least one embodiment, the backend system 16 sends or transmits this query via a communication link of the land network 14—e.g., via the internet; however, this is not required. For example, other communications are contemplated that are wired, wireless, or a combination thereof. In at least one embodiment, the backend system 16 places an application programming interface (API) call (or transmits a clearinghouse call) that includes the query to the WSP 22 (or the WSP server 23). Further, the query includes the unique identifier of step 210 (or even multiple identifiers)—which may be used by the WSP server 23 to identifier the particular vehicle 24. In some embodiments, the backend system 16 may place the call automatically, and the backend system 16 may receive a response automatically as well—e.g., receive an automated response or so-called 'auto-response.'

In step 220 which follows, the backend system may interpret the auto-response received from the WSP 22 or the WSP server 23. And for example, the contents of the response may include an indication of the connection status of the vehicle 24. More particularly, the connection status may indicate that the vehicle 24 is in the connected state or the un-connected state. If the vehicle is in the connected state, the method proceeds to step 240 where a cellular call will be placed to vehicle 24; however, if the vehicle 24 is in the un-connected state, the method proceeds to step 225 (where a cellular call will not be placed, as least at this present time).

Thus, it should be appreciated that by querying the WSP 22 or the WSP server 23 and receiving an automated response, the backend system 16 can avoid computing inefficiencies pertaining to placing cellular calls to vehicle 24 when the vehicle is in the unconnected state. Further, additional cellular network traffic can be minimized since the backend system has pre-qualified establishing the cellular connection using the land network 14.

In step 225, the vehicle identifier—e.g., the phone number of the vehicle telematics unit 32—may be stored in a retry table of memory 54 (server 18). The retry table comprises information pertaining to vehicles which were determined (e.g., by API call) to be in an un-connected state. The table may include other information as well such as a vehicle system update identifier, a notification identifier, a time-stamp indicating when the API call was placed, etc., just to name a few examples. An illustrative retry table is shown below. As will be explained in greater detail below, data from the table may be used to place one or more future API calls. And of course, while a vehicle phone number is shown in Table I as the identifier, other identifiers could be used instead.

TABLE I

| Vehicle Description | | Timestamp | Received Update 001? | Received Update 002? | Received Update 003? | Counter |
|---|---|---|---|---|---|---|
| 24 | (111) 111-1111 | 2016:08:06:08:30:44 | YES | YES | NO | 1 |
| 24' | (111) 111-1112 | 2016:08:06:08:30:44 | YES | YES | NO | 1 |
| 24" | (111) 111-1113 | 2016:08:06:08:30:44 | YES | YES | NO | 1 |
| 24'" | (111) 111-1114 | 2016:08:06:08:30:44 | YES | YES | NO | 1 |

In step 230 which follows step 225, the backend server 18 may utilize a flag or counter to indicate how may API calls have been placed regarding the particular vehicle 24. In some implementations, the duration of time between API calls may be associated with the counter value, as explained below. Thus, continuing with the present example, the counter may be incremented to '1,' and this incremental data also may be stored in the retry table. It should be appreciated that this step is optional. Thus, in at least one embodiment, the method may skip step 230 and proceed directly from step 220 to step 235.

Step 235 which follows may be a time buffer or a delay. For example, in step 235, a predetermined period of time may pass during which the backend server 18 does not send another query to WSP 22 or WSP server 23—and the backend system does not attempt to place a cellular call to vehicle 24. The duration of the period of time may be measured from the timestamp in the retry table, and may be of any suitable duration. For example, if a priority of the vehicle system update is less urgent, the duration may be 24 hours. Other examples are also possible. Furthermore, it should be appreciated that during step 235, the backend server 18 may place API calls to the WSP 22 or WSP server 23 regarding other vehicles (e.g., regarding vehicles other than vehicle 24) or may place cellular calls to vehicles which it has pre-qualified to be connected to the wireless carrier system 12. Step 235 ends when the predetermined period of time expires; thereafter, the method 200 loops back to step 215.

Thus, method 200 may repeat at least steps 215 and 220 again. For example, while repeating step 215, a second API call may be placed regarding vehicle 24, and as described above, depending on the auto-response from the WSP 22 or WSP server 23, the method again may proceed to step 225 or step 240. If the method proceeds through steps 225, 230, 235, 215, and 220 again, a new timestamp may be recorded and the counter may be incremented to '2' and the retry table may be updated accordingly.

In at least one embodiment, the duration of the predetermined time delay in step 235 is associated with the counter value. For example, the duration may be increased when the value equals 2, 3, 4, . . . . Or for each repetition of step 230, the duration may increase. In one embodiment, the delay may be configured so that API calls are placed at different times during the day, etc. These are merely examples; other configurations also may exist.

When in step 220 the response to the query indicates that the connection status of vehicle 24 is connected, then in step 240 the backend system attempts to place a cellular call to vehicle 24. The placement of the cellular call may occur within a relatively short period of time following the determination that the vehicle 24 is in the connected state. Non-limiting examples of predetermined periods of time in which to place the cellular call to vehicle 24 include within ten seconds, within one minute, within five minutes, etc. For example, it will be appreciated that if (relatively speaking) too much time passes, the vehicle connection status may change—e.g., the vehicle could enter an underground parking garage or otherwise lose connectivity with the wireless carrier system 12.

Step 240 also may include establishing a cellular connection between the vehicle backend system 16 and the vehicle 24. Once the cellular connection is established, the backend system may deliver or transmit the vehicle system update (identified in step 205) to the vehicle 24 so that it may be installed in due course. Following step 240, the method 200 may end.

The backend system 16 may pre-qualify an establishing of a cellular connection with the vehicle 24 for other reasons as well. For example, the backend system 16 may wish to transmit a notification to the vehicle 24—e.g., a push notification that includes an audio or video file, a text notification regarding vehicle maintenance, etc. These again are merely examples; other messages or communications desired by the backend system 16 are contemplated as well.

FIG. 2 was described above with respect to a single vehicle—vehicle 24. However, it should be appreciated that the backend system 16 may perform a similar method for countless numbers of vehicles. Collectively, vehicles 24, 24', 24", 24'" are illustrative. In step 205, backend server 18 may identify that each of these vehicles requires Update 003 (Table I). Thus, in step 205, system 16 may compile a list or listing of vehicles that includes vehicles 24, 24', 24", 24'".

Continuing with the example, in step 210, backend system 16 may acquire a unique identifier for each of the vehicles 24, 24', 24", 24'"—e.g., a phone number or the like. And in step 215, backend system 16 may send an API call to the WSP 22 or WSP server 23 with a batch query, wherein the batch query includes the identifiers and requesting of the WSP or the WSP server the connection statuses associated with each of vehicles 24, 24', 24", 24'", respectively. In response, the backend system 16 may receive a response that indicates different connection statuses for the vehicles 24, 24', 24", 24'". And the remaining steps (or looped back steps) described above may be carried out for each of the vehicles 24, 24', 24", 24'".

In order to carry out the method described above, it should be appreciated that the backend system 16 may be configured using electronic hardware, software, or the like. For example, one or more remote servers 18 may be configured accordingly. To illustrate, the memory device(s) 54 of at least one server 18 may store computer program instructions executable by processor(s) 52. The instructions may include any and all necessary instructions, code, etc. necessary to carry out the steps of the methods discussed above, including but not limited to: instructions to place an application programming interface (API) call to one of a wireless service provider (WSP), a Home Location Register (HLR) associated with the WSP, or a Home Subscriber Server (HSS) associated with the WSP, wherein the API call includes a query associated with a connection status of the vehicle to a wireless carrier system (WCS) used by the WSP; instructions to receive a response to the query in response to placing the API call, wherein the response to the query indicates, with respect to the WCS, that the vehicle connection status is one of a connected state or an un-connected state, wherein the connected state indicates that the vehicle is registered with or attached to a cell in the WCS, wherein the un-connected state indicates that the vehicle is presently unregistered with or presently unattached to a cell in the wireless carrier system; instructions to attempt to establish the cellular connection between the backend system and the vehicle when the vehicle connection status is the connected state; and instructions to delay an attempt to establish the cellular connection between the backend system and the vehicle for a predetermined period of time when the vehicle connection status is the un-connected state, and following the predetermined period of time, instructions to place another API call, and instructions to repeat the instructions associated with receiving the response to the query, in response to placing the another API call.

The computer program instructions stored on memory 54 and executable by processor(s) 52 could also include one or more of the following: when the instructions determine that the vehicle connection status is the un-connected state, instructions to further repeat the instructions to place another API call and in response to placing the another API call, instructions to repeat the instructions associated with receiving the response to the query, wherein a duration of the predetermined period of time increases with further repetition; instructions to store at the backend system an identifier associated with the vehicle when the vehicle is in the un-connected state, wherein the identifier is stored with a plurality of identifiers associated with a plurality of other vehicles which are also determined to be in the un-connected state; and instructions to provide a vehicle service via a cellular call that is established in response to the instructions to attempt to establish the cellular connection between the backend system and the vehicle, wherein the vehicle service includes providing via the cellular call at least one of: a vehicle system update or a notification to a user of the vehicle, wherein providing the vehicle service is based on a previously-established subscriber relationship between the vehicle and the backend system.

Other suitable instructions are possible as well. These are merely examples.

Thus, there has been described a method of determining availability of a cellular connection between a vehicle backend system and a vehicle prior to the backend system attempting to establish the cellular connection. In addition, there has been described a vehicle backend configuration that is capable of carrying out the method. The pre-qualification includes, before attempting to place a cellular call to a subscriber vehicle, sending a query to a wireless service provider (WSP) or a server associated therewith requesting information pertaining to whether the vehicle is connected to a wireless carrier system. Thereafter, the backend system places a cellular call to the vehicle or does not place a cellular call to the vehicle based on a response from the WSP or WSP server.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of determining availability of a cellular connection between a backend system and a vehicle prior to the backend system attempting to establish the cellular connection, comprising the steps of:
   determining at the backend system that a vehicle service is to be provided to the vehicle; based on the determination, transmitting from the backend system to a wireless service provider (WSP) or a WSP server a query associated with a connection status of the vehicle to a wireless carrier system (WCS) used by the WSP;
   in response to transmitting the query, receiving at the backend system a response to the query, wherein the response indicates, with respect to the WCS, that the vehicle is either in a connected state or an un-connected state; when the vehicle is in the connected state:
   attempting to establish the cellular connection between the backend system and the vehicle by placing a cellular call between the backend system and the vehicle; and when the cellular connection is established, providing the vehicle service via the cellular call in response to the established cellular connection; and when the vehicle is in the un-connected state:
   (a) delaying an attempt to establish the cellular connection between the backend system and the vehicle for a predetermined period of time;
   (b) following the predetermined period of time, transmitting another query associated with the connection status of the vehicle to the WSP or WSP server;
   (c) in response to transmitting the another query, receiving at the backend system another response to the another query, wherein the another response indicates, with respect to the WCS, that the vehicle is either in a connected state or an un-connected state;
   (d) when the vehicle is in the connected state: attempting to establish the cellular connection between the backend system and the vehicle by placing the cellular call between the backend system and the vehicle; and when the cellular connection is established, providing the vehicle service via the cellular call in response to the established cellular connection; and
   (e) when the vehicle is in the un-connected state:
   repeating steps (a), (b), and (c) with respect to the another response to the another query; wherein the method further comprises, when the vehicle is in the un-connected state:

storing at the backend system an identifier associated with the vehicle, using the identifier when transmitting the another query, wherein the identifier is stored with a plurality of identifiers associated with a plurality of other vehicles which are also determined to be in the un-connected state, and transmitting additional queries to the plurality of other vehicles using the respective plurality of identifiers.

2. The method of claim 1, wherein, when steps (a), (b), and (c) are repeated, then extending a duration of the predetermined period of time.

3. The method of claim 1, wherein the query further comprises a batch query, wherein the batch query includes requesting of the WSP or the WSP server a plurality of connection statuses associated with the vehicle and a plurality of other vehicles.

4. The method of claim 1, further comprising placing from the backend system an application programming interface (API) call to the WSP or WSP server, wherein the API call includes the query, wherein the receiving step further comprises receiving an automated response from the WSP or WSP server indicating the connection status of the vehicle.

5. The method of claim 1, wherein the WSP server is a Home Location Register (HLR) associated with the WSP or a Home Subscriber Server (HSS) associated with the WSP, wherein the HLR or HSS stores data associated with a telematics unit of the vehicle.

6. The method of claim 1, wherein the query includes a unique identifier associated with the vehicle.

7. The method of claim 6, wherein the unique identifier is one of a mobile directory number (MDN), an international mobile subscriber identity (IMSI), or a device ID that includes one of a mobile equipment identifier MEID), an international mobile station equipment identity (IMEI) or an electronic serial number (ESN).

8. The method of claim 1, wherein the connected state indicates that the vehicle is registered with or attached to a cell in the WCS, wherein the un-connected state indicates that the vehicle is presently unregistered with or presently unattached to a cell in the WCS.

9. The method of claim 1, wherein the vehicle service includes providing via the cellular call at least one of: a vehicle system update or a notification to a user of the vehicle.

10. A vehicle backend system that is configured to determine availability of a cellular connection between said backend system and a vehicle prior to said backend system attempting to establish the cellular connection, comprising, at least one processor and at least one memory device, wherein the at least one memory device stores computer program instructions executable by the at least one processor, wherein the computer program instructions comprise:

instructions to place an application programming interface (API) call to one of a wireless service provider (WSP), a Home Location Register (HLR) associated with the WSP, or a Home Subscriber Server (HSS) associated with the WSP, wherein the API call includes a query associated with a connection status of the vehicle to a wireless carrier system (WCS) used by the WSP;

instructions to receive a response to the query in response to placing the API call, wherein the response to the query indicates, with respect to the WCS, that the vehicle connection status is one of a connected state or an un-connected state;

instructions to attempt to establish the cellular connection between the backend system and the vehicle when the vehicle connection status is the connected state;

instructions to delay an attempt to establish the cellular connection between the backend system and the vehicle for a predetermined period of time when the vehicle connection status is the un-connected state, and following the predetermined period of time, instructions to place another API call, and instructions to repeat the instructions associated with receiving the response to the query, in response to placing the another API call; and instructions to store at the backend system an identifier associated with the vehicle when the vehicle is in the un-connected state, wherein the identifier is stored with a plurality of identifiers associated with a plurality of other vehicles which are also determined to be in the un-connected state.

11. The system of claim 10, further comprising, when the instructions determine that the vehicle connection status is the un-connected state, instructions to further repeat the instructions to place another API call and in response to placing the another API call, instructions to repeat the instructions associated with receiving the response to the query, wherein a duration of the predetermined period of time increases with further repetition.

12. The system of claim 10, wherein the query further comprises a batch query, wherein the batch query requests of the WSP, the HLR, or the HSS a plurality of connection statuses associated with a plurality of vehicles.

13. The system of claim 10, wherein the response to the query is an automated response from the WSP, the HLR, or the HSS.

14. The system of claim 10, wherein the HLR or the HSS stores data associated with a telematics unit of the vehicle, wherein the telematics unit is used to provide subscriber vehicle services to the vehicle.

15. The system of claim 10, wherein the query includes a unique identifier associated with the vehicle, wherein the unique identifier is one of a mobile directory number (MDN), an international mobile subscriber identity (IMSI), or a device ID that includes one of a mobile equipment identifier (MEID), an international mobile station equipment identity (IMEI), or an electronic serial number (ESN).

16. The system of claim 10, further comprising instructions to provide a vehicle service via a cellular call that is established in response to the instructions to attempt to establish the cellular connection between the backend system and the vehicle, wherein the vehicle service includes providing via the cellular call at least one of: a vehicle system update or a notification to a user of the vehicle, wherein providing the vehicle service is based on a previously-established subscriber relationship between the vehicle and the backend system.

17. The system of claim 10, wherein the connected state indicates that the vehicle is registered with or attached to a cell in the WCS, wherein the un-connected state indicates that the vehicle is presently unregistered with or presently unattached to a cell in the wireless carrier system.

* * * * *